(12) United States Patent
Maltsev et al.

(10) Patent No.: US 9,813,131 B2
(45) Date of Patent: Nov. 7, 2017

(54) METHOD AND SYSTEM FOR BEAM ALIGNMENT ON DIRECTIONAL WIRELESS LINKS

(71) Applicant: Intel Corporation, Santa Clara, CA (US)

(72) Inventors: Alexander Maltsev, Nizhny Novgorod (RU); Gregory Morozov, Nizhny Novgorod (RU); Vadim Sergeyev, Nizhny Novgorod (RU); Alexei Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/128,073

(22) PCT Filed: Jul. 28, 2014

(86) PCT No.: PCT/RU2014/000568
§ 371 (c)(1),
(2) Date: Sep. 21, 2016

(87) PCT Pub. No.: WO2016/018168
PCT Pub. Date: Feb. 4, 2016

(65) Prior Publication Data
US 2017/0111095 A1    Apr. 20, 2017

(51) Int. Cl.
*H04K 1/10*    (2006.01)
*H04L 27/28*    (2006.01)
*H04B 7/06*    (2006.01)

(52) U.S. Cl.
CPC ........... *H04B 7/0617* (2013.01); *H04B 7/063* (2013.01)

(58) Field of Classification Search
CPC .... H04B 7/0617; H04B 7/063; H04B 7/0491; H04L 5/0051
(Continued)

(56) References Cited

U.S. PATENT DOCUMENTS

2009/0232240 A1* 9/2009 Lakkis ............... H04B 7/0491
                                                        375/260
2016/0043781 A1* 2/2016 Cho .................... H04L 5/0051
                                                        342/373

FOREIGN PATENT DOCUMENTS

WO    WO-2016018168 A1    2/2016

OTHER PUBLICATIONS

"International Application Serial No. PCT/RU2014/000568, International Search Report dated May 4, 2015", 3 pgs.
(Continued)

*Primary Examiner* — Phuong Phu
(74) *Attorney, Agent, or Firm* — Schwegman Lundberg & Woessner, P.A.

(57) ABSTRACT

Embodiments of a system and method for simultaneous high-speed multi-user beam tracking in a Wireless Network are generally described herein. A transmitting station (STA) may be configured to support directional wireless links with multiple receiving STAs in a high-mobility millimeter-wave (mm Wave) wireless network. The transmitting STA may include hardware processing circuitry configured to, for each of the multiple receiving STAs, transmit a packet over a directional wireless link between the transmitting STA and the receiving STA and receive transmit antenna performance metrics from the receiving STA. The packet may include a data portion, a receive training sequence, and a transmit training sequence that occupy different portions of the packet, and the transmission of the packet over the directional wireless link may include transmission of the data portion of the packet according to a current transmit antenna direction associated with the directional wireless link.

28 Claims, 7 Drawing Sheets

(58) Field of Classification Search
   USPC .................. 375/260, 267, 299, 347; 342/373
   See application file for complete search history.

(56) References Cited

OTHER PUBLICATIONS

"International Application Serial No. PCT/RU2014/000568, Written Opinion dated May 4, 2015", 8 pgs.

* cited by examiner

METHOD AND SYSTEM FOR BEAM ALIGNMENT ON DIRECTIONAL WIRELESS LINKS

This application is a U.S. National Stage Filing under 35 U.S.C. 371 from International Application No. PCT/RU2014/000568, filed Jul. 28, 2014 and published in English as WO 2016/018168 on Feb. 4, 2016, which is incorporated herein by reference in its entirety for all acceptable purposes.

TECHNICAL FIELD

Embodiments pertain to wireless communications. Some embodiments relate to wireless networks or mobile devices configured to operate in accordance with one or more millimeter wave (mmWave) standards, such as IEEE 802.11ad or WiGig. Some embodiments relate to wireless networks or mobile devices configured to operate in accordance with other standards, such as various versions of the IEEE 802.11 or 3GPP standards. Some embodiments pertain to wireless networks or mobile devices that support multi-user wireless communication with directional antennas, beam alignment or beam tracking.

BACKGROUND

In millimeter wave (mmWave) communication systems, high data throughput may be achieved through directional wireless links between transmitting and receiving devices. As an example, an access point (AP) may provide high data rate traffic to multiple user stations (STAs) over directional wireless links that are substantially isolated from one another. In some cases, communication on directional wireless links may include directional transmission of a beam from the transmitting device along with directional reception of the beam at the receiving device. A beam alignment process for the directional links may be used to improve performance, to track mobile devices in motion, or to help deal with changes in the physical environment in which the devices are operating.

As part of the beam alignment process, some of the packets sent over the link may include a receive training sequence to enable the receiving device to train it's receive direction for the link. In addition, other packets may include a known transmit training sequence that may enable the receiving device to select or provide feedback about the transmit direction for the link. Although the use of the training sequences may cause significant overhead on the link, such a beam alignment process may be increasingly necessary in systems that support outdoor operation or expect high mobility, such as next generation mmWave systems. In addition, current and future mmWave systems may need to support many directional wireless links simultaneously, for instance between an AP and multiple STAs. Thus, there are general needs for systems and methods for simultaneous high-speed multi-user beam tracking.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims. In some embodiments, mobile devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device can be a user station (STA) configured to operate in accordance with at least one version of the IEEE 802.11 standard, including IEEE 802.1 lad, or with other standards including WiGig, 3GPP, or any other suitable wireless standard. In some embodiments, the mobile device may include one or more of a keyboard, a display, a non-volatile memory port, multiple antennas, a graphics processor, an application processor, speakers, and other mobile device elements. The display may be an LCD screen including a touch screen.

Figure 1:
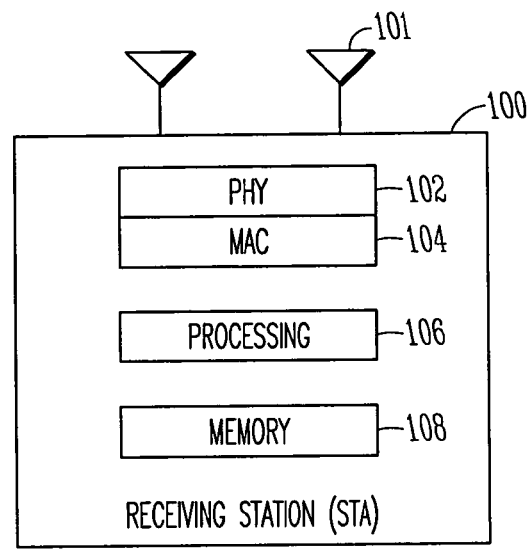
FIG. 1 is a block diagram of a receiving station (STA) in accordance with some embodiments.

FIG. 1 is a block diagram of a receiving station (STA) in accordance with some embodiments. The receiving STA 100 may be any suitable wireless device, including a mobile device, base station or access point (AP). The receiving STA 100 may include physical layer circuitry 102 for transmitting and receiving signals to and from Access Points (APs), other STAs or other mobile devices using one or more antennas 101. Receiving STA 100 may also include medium access control layer (MAC) circuitry 104 for controlling access to the wireless medium. Receiving STA 100 may also include processing circuitry 106 and memory 108 arranged to perform the operations described herein.

Figure 2:
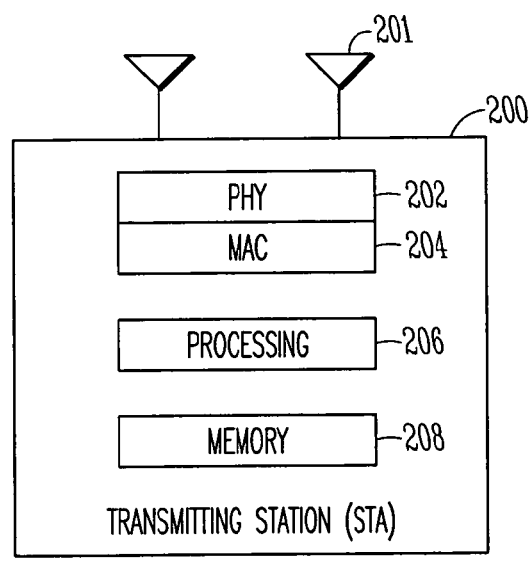
FIG. 2 is a block diagram of a transmitting station (STA) in accordance with some embodiments.

FIG. 2 is a block diagram of a transmitting station (STA) in accordance with some embodiments. The transmitting STA 200 may be any suitable wireless device, including a mobile device, base station or access point (AP). The transmitting STA 200 may include physical layer circuitry 202 for transmitting and receiving signals to and from Access Points (APs), other STAs or other mobile devices using one or more antennas 201. Transmitting STA 200 may also include medium access control layer (MAC) circuitry 204 for controlling access to the wireless medium. Transmitting STA 200 may also include processing circuitry 206 and memory 208 arranged to perform the operations described herein.

The antennas 101, 201 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 101, 201 may be effectively separated to take advantage of spatial diversity and the different channel characteristics that may result.

Although the receiving STA 100 and the transmitting STA 200 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, a transmitting STA 200 may be configured to support directional wireless links with multiple receiving STAs 100 in a high-mobility millimeter-wave (mmWave) wireless network. In some embodiments, the transmitting STA 200 can be an Access Point (AP) or base station and the receiving STAs 100 can be mobile devices. The transmitting STA 200 may include hardware processing circuitry configured to, for each of the multiple receiving STAs 100, transmit a packet over a directional wireless link between the transmitting STA 200 and the receiving STA 100 and receive transmit antenna performance metrics from the receiving STA 100. The packet may include a data portion, a receive training sequence, and a transmit training sequence that occupy different portions of the packet, and the transmission of the packet over the directional wireless link may include transmission of the data portion of the packet according to a current transmit antenna direction associated with the directional wireless link. These embodiments are described in more detail below.

A receiving STA 100 may be configured to support directional wireless links with multiple transmitting STAs 200 in a high-mobility mmWave wireless network. In some embodiments the receiving STA 100 can be an AP or base station, and the transmitting STAs 200 may be mobile devices.

It is noted here that for the sake of illustration, some of the disclosed examples may focus on devices operating in an IEEE 802.11 network, such as IEEE 802.11 ad. However, the subject matter disclosed is not limited to those devices or to IEEE 802.11 networks, and may be applied to other suitable types of devices, wireless networks or systems using any suitable radio interface, which may be different from the radio interface(s) associated with IEEE 802.11 specifications. As an example, methods and subject matter disclosed herein may be applied to devices and networks configured to operate according to 3GPP standards or other IEEE standards. In addition, methods and subject matter disclosed herein may be applied to devices and networks configured to operate according to evolutions of IEEE 802.11 standards, 3GPP standards or other IEEE standards.

Figure 3:
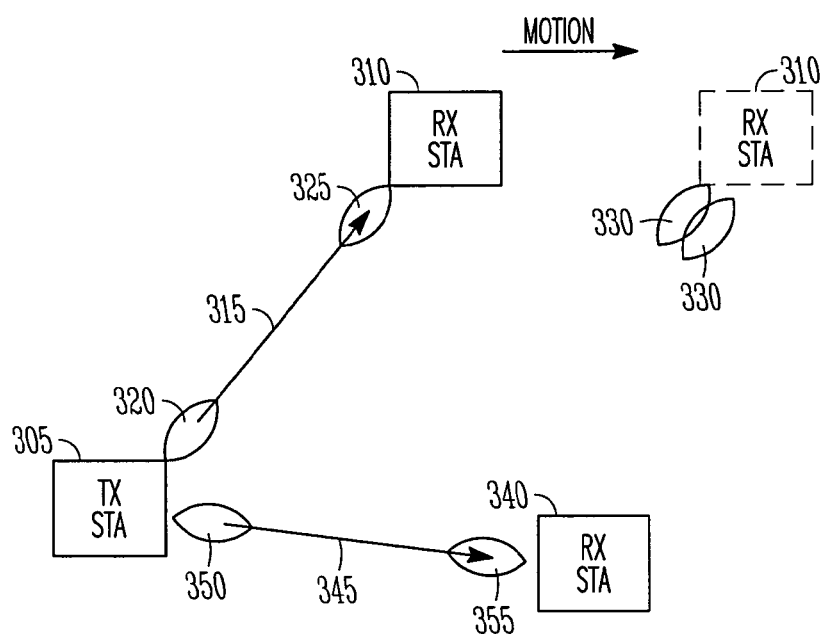
FIG. 3 illustrates an example of a system supporting a transmitting STA and two receiving STAs in accordance with some embodiments.

Referring to FIG. 3, an example of a system 300 that may support embodiments disclosed herein is shown, the system 300 including a transmitting STA 305 transmitting over directional wireless links 315, 345 with two receiving STAs 310, 340. It should be noted that the configuration shown in FIG. 3 is not limiting, as the system 300 may also support more or fewer transmitting or receiving STAs than what is shown in FIG. 3. The transmitting STA 305 may transmit packets or other wireless signals to the receiving STA 310 over the directional wireless link 315. Transmission over the link 315 may include transmission of wireless signals from the transmitting STA 305 according to the transmit direction 320, and the wireless signals may be received at the receiving STA 310 according to the receive direction 325. As such, the link 315 may be said to operate according to the transmit direction 320 and receive direction 325. Similarly, the transmitting STA 305 may transmit packets or other wireless signals to the receiving STA 340 over the directional wireless link 345, in which the link 345 may be said to operate according to the transmit direction 350 and receive direction 355. As known in the art, the transmission or reception according to a direction may be realized using any known techniques such as beam-steering or through selection of coefficients or parameters on an antenna array. It should be noted that as used herein, the term "according to a direction" when referencing transmission or reception on a directional antenna may refer to transmission or reception on the antenna such that a substantial amount of energy is transmitted or received in that direction, or that the antenna has been configured (temporarily or permanently) to transmit or receive substantially in the direction.

As indicated by the dotted-line demarcation, the receiving STA 310 in this example moves to a new location, which may affect its beam-alignment over the link 315 with the transmitting STA 305. As a result of the motion, and depending on the distance moved or other factors, the performance of the link 315 may suffer in terms of packet error rate, throughput, latency or other suitable performance metric. A beam alignment process may attempt to determine an updated receive direction that may improve performance at the new location for the receiving station 310. As shown in FIG. 3, two candidate receive directions 330 may be investigated as possible receive directions to be used as the updated receive direction. This scenario is not limiting, however, as any number of candidate receive directions 330 may be used or any suitable technique may be used to determine the updated receive direction. In addition, although the second receiving STA 340 is not shown as moving in this example, the system 300 is not limited as such, as any or all of the receiving STAs 310, 340 or others not shown may be in motion or stationary on either a temporary or permanent basis.

It should be pointed out that, as known in the art, a directional wireless link may support only one-way communication in some cases. That is, the transmitting STA 305 may transmit packets to the receiving STA 310 over the link 315, but the receiving STA 310 may not transmit packets to the transmitting STA 305 over that same link 315. Instead, the receiving STA 310 may transmit packets to the transmitting STA 305 over a different directional wireless link (not shown). As such, two different one-way directional wireless links enable the two STAs 305, 310 to communicate with each other in both directions. The necessity for the two links may be related to the environment, as the path(s) from a first STA to a second STA may be generally uncorrelated with the path(s) from the second STA back to the first STA. Such cases are particularly common in outdoor environments and environments with many physical obstacles. In addition, differences in interference environments or differences in constructions of the transmitters and receivers at different sides of the link may cause or contribute to differences in the two directional links described.

Accordingly, methods described herein may refer to beam alignment of one way directional wireless links, although not limited as such. In addition, directional communication between a first STA and a second STA may include beam alignment of a first link with the first STA as the transmitting STA and the second STA as the receiving STA. Beam alignment may also be performed (independently or jointly) on a second link, in which the first STA is the receiving STA and the second STA is the transmitting STA.

Figure 4:
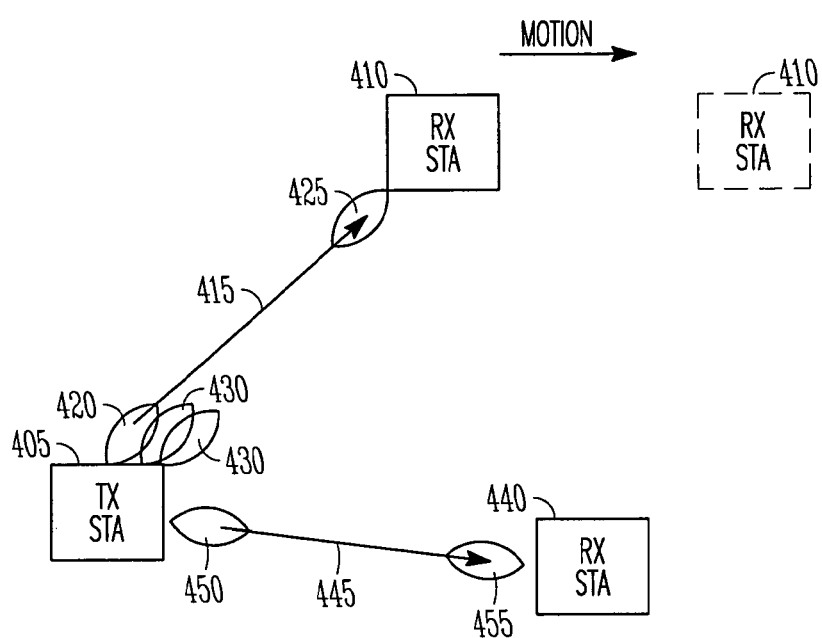
FIG. 4 illustrates another example of a system supporting a transmitting STA and two receiving STAs in accordance with some embodiments.

Referring to FIG. 4, another example of a system 400 that may support embodiments disclosed herein is shown, the system 400 including a transmitting STA 405 transmitting over directional wireless links 415, 445 with two receiving STAs 410, 440 respectively. As noted for the example shown in FIG. 3, the configuration shown in FIG. 4 is also not limiting, as the system 400 may also support more or fewer transmitting or receiving STAs than what is shown in FIG. 4, any or all of which may be moving or stationary. The transmitting STA 405 may transmit packets or other wireless signals to the receiving STA 410 over the directional wireless link 415 according to the transmit direction 420. The packets or wireless signals may be received at the receiving STA 410 according to the receive direction 425. The receiving STA 410 is shown to be in motion in FIG. 4, and similarly to the example shown in FIG. 3, the motion may result in a situation in which performance over the wireless link 415 is degraded as a result of the transmit direction 420 no longer being accurate or optimum. Accordingly, the transmitting STA 405 may transmit signals to the receiving STA 410 according to other candidate transmit directions 430. Based on the reception, the receiving STA 410 may be able to select one of the candidate transmit directions 430 as the best one, and may provide feedback to the transmitting STA 405 for that purpose. Although only two candidate transmit directions 430 are shown in FIG. 4, the system 400 is not limited as such, as any number of candidate transmit directions may be used.

Figure 5:
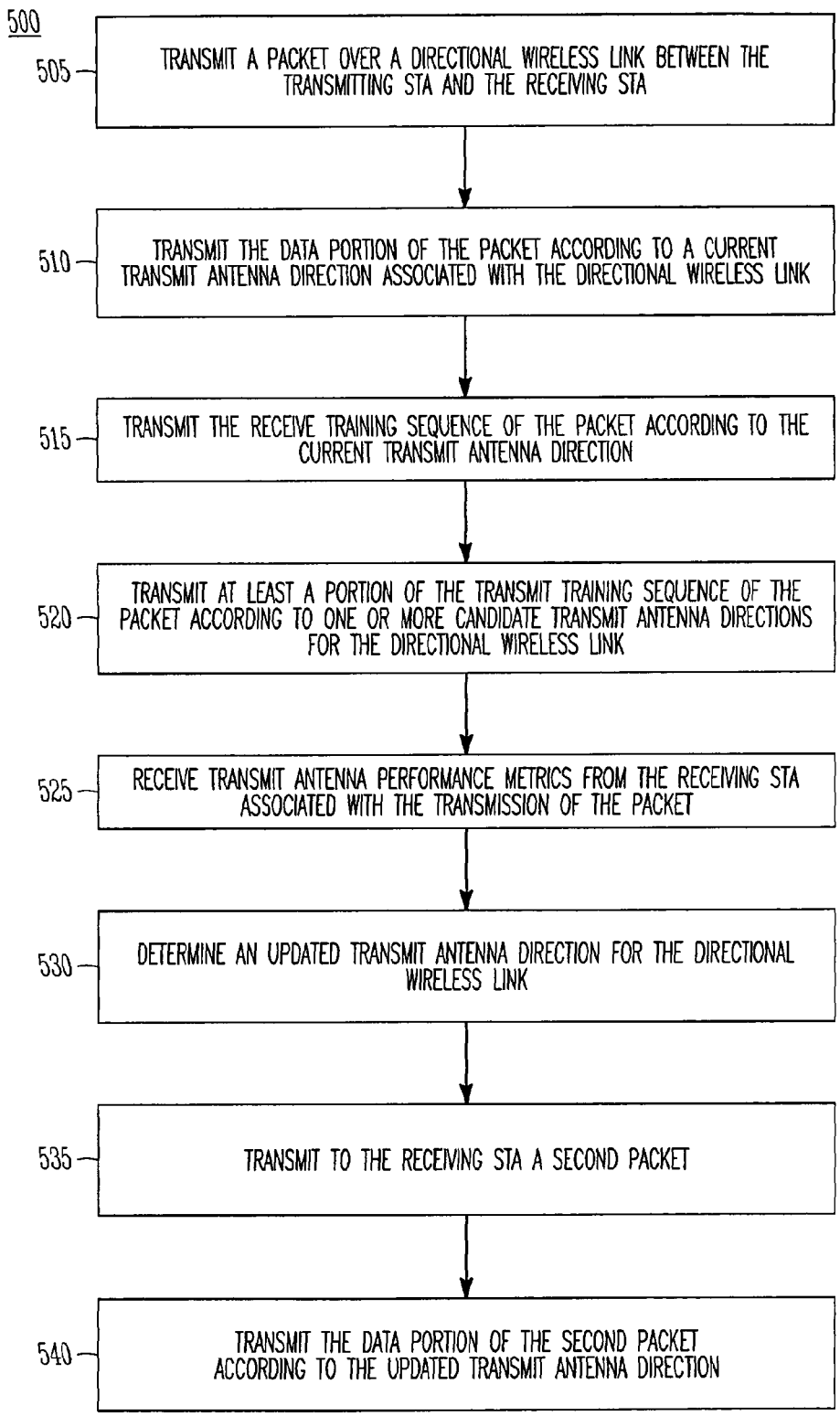
FIG. 5 illustrates a method of beam alignment of directional wireless links in accordance with some embodiments.

Referring to FIG. 5, a method 500 of beam-alignment of directional wireless links between a transmitting STA and multiple receiving STAs is shown. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-8, although it is understood that the method 500 may be practiced with any other suitable systems, interfaces and components. In addition, while the method 500 and other methods described herein may refer to STA's operating in accordance with IEEE 802.11 ad, embodiments of those methods are not limited to just those STA's and may also be practiced on other mobile devices. Moreover, the method 500 and other methods described herein (such as methods 700 and 800) may be practiced by wireless devices configured to operate in other suitable types of wireless communication systems, including systems configured to operate according to 3GPP or various IEEE standards.

The method 500 may be practiced between a transmitting STA and a single receiving STA, but is not limited as such, and may also be practiced between the transmitting STA and multiple receiving STAs. In some embodiments, the transmitting STA may be an AP or base station while the receiving STAs may be mobile devices. In some embodiments, for each of multiple receiving STAs, any or all of the operations 505-540 (or additional operations not shown) may be performed. While the discussion below will focus on the operations 505-540 as applied to embodiments that include a single receiving STA, it should be noted that the discussion also may be applied to embodiments that include multiple receiving STAs. At operation 505, a packet may be transmitted over a directional wireless link between a transmitting STA and a receiving STA. As described previously, transmission on the directional wireless link may be performed at the transmitting STA according to a current transmit antenna direction while reception on the directional wireless link may be performed according to a current receive antenna direction at the receiving STA. It should be mentioned that in some embodiments, operation 505 may be performed for each of multiple receiving STAs, and performance of operation 505 for the multiple receiving STAs may be performed simultaneously.

Figure 6:
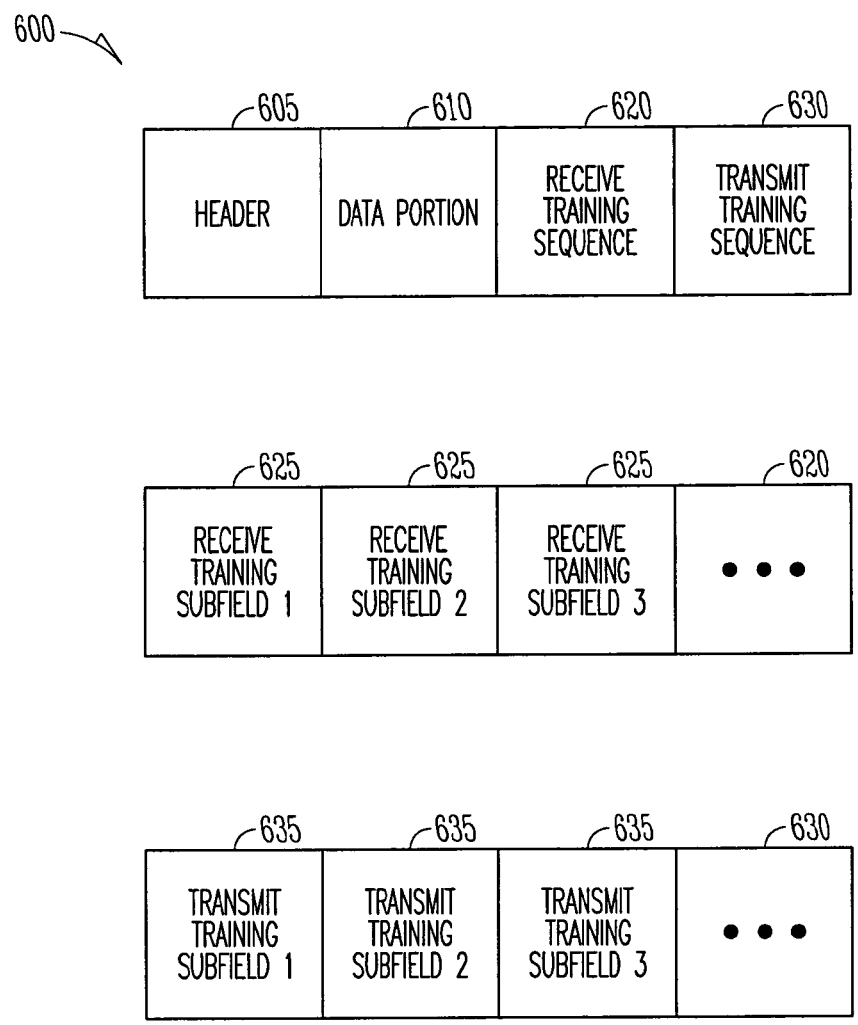
FIG. 6 illustrates an example of a packet that may be used as part of methods disclosed herein in accordance with some embodiments.

The non-limiting example shown in FIG. 6 illustrates an embodiment of the packet 600, which may be used in describing the method 500 or other methods disclosed herein. The packet 600 may include any or all of a header 605, a data portion 610, a receive training sequence 620, and a transmit training sequence 630, which may appear in any order within the packet 600 and are not limited to occupying contiguous portions within the packet 600. It should be noted that, although not shown, the packet 600 may include other fields, such as sequences used for automatic gain control (AGC) or other purposes. The header 605 may include control or other information that may describe the contents of the packet 600. As an example, the header 605 may indicate if the packet 600 includes the receive training sequence 620, the transmit training sequence 630, neither of the two or both of the two.

It should be pointed out that in some embodiments that include both a receive training sequence 620 and a transmit training sequence 630, the presence of both may enable beam alignment of both the transmit and receive directions during every transmitted packet. Such a high rate of performing the beam alignment may be necessary or beneficial in some cases previously described, such as outdoor or high mobility systems. In comparison, embodiments that only include one of the receive training sequence 620 or transmit training sequence 630 in each packet may not perform as well. In those embodiments, the alignment for each of the receive and transmit directions may only be addressed 50% of the time in comparison to embodiments with packets that include both sequences.

In addition, as shown in FIG. 6, the receive training sequence 620 may include one or more receive training subfields 625, while the transmit training sequence 630 may include one or more transmit training subfields 635. The receive training subfields 625 and transmit training subfields 635 may include data sequences known at both the transmitting STA and receiving STA. In some embodiments, the data sequences may be Golay sequences, Zadoff-Chu sequences, or other suitably chosen sequences with desirable correlation properties, as known in the art, but those embodiments are not limiting, as any sequences may be used. In addition, the number of receive training subfields 625 and transmit training subfields 635 are not limited to that shown in FIG. 6. Moreover, in some embodiments, the receive training sequence 620 and transmit training sequence 630 may not even include any subfields, and may include just one or more data sequences.

At operation 510, the data portion 610 of the packet 600 may be transmitted according to a current transmit antenna direction associated with the directional wireless link, while the receive training sequence 620 of the packet 600 may be transmitted according to the current transmit antenna direction at operation 515. The transmit training sequence 630 of the packet 600, or at least a portion of the transmit training sequence 630, may be transmitted according to one or more candidate transmit antenna directions for the link at operation 520.

The data portion 610 and the receive training sequence 620 may be transmitted according to the current transmit antenna direction associated with the directional wireless link, which may have been previously established as a direction that gives good performance or is optimum in some sense. As mentioned earlier, due to motion of the transmitting or receiving STA or changes in the environment such as the addition of new obstacles, the best direction (transmit or receive or both) may need to be determined or tracked. Accordingly, the transmit training sequence 630 may be transmitted according to candidate transmit antenna directions in order to provide the receiving STA the opportunity to test them as possible updated transmit antenna directions for the link. As an example, during the tracking process, the candidate transmit antenna directions may be based on the current transmit antenna direction, for instance being within an angle of one degree of the current transmit antenna direction. As another example, in situations like initial acquisition or determination of the directions for the link, the candidate directions may not be related to the current direction. As an example, during initial acquisition, the candidate directions may be formed by dividing the 360 degrees of a circle into discrete angles, such as those separated by 45 degrees.

As previously described, the transmit training sequence 630 may include one or more transmit training subfields 635, and in some embodiments, some of the transmit training subfields 635 may utilize each of the candidate transmit antenna directions. As an example, each of the transmit training subfields 635 may be transmitted according to a different candidate transmit antenna direction. As another example, multiple transmit training subfields 635 may be transmitted according to each of the different candidate transmit antenna directions. It should be noted that in some embodiments, the transmit training subfields 635 may need to be sufficiently long so that any transients that result from switching the transmit antenna direction can have time to taper off. As an example, if the transmit training subfields 635 labeled as "1" and "2" in FIG. 6 are transmitted according to two different candidate transmit antenna directions, the beginning portion of the transmit training subfield 635 labeled "2" may be distorted and not useful to the receiving STA for measurement of the quality of transmission according to that particular direction.

At operation 525, transmit antenna performance metrics may be received from the receiving STA, and at operation 530, an updated transmit antenna direction for the directional wireless link may be determined. The transmit antenna performance metrics may be related to the transmission of the packet 600. In some embodiments, the metrics may be related to the reception of the transmit training subfields 635 at the receiving STA. For example, for a particular transmit training subfield 635 that transmits according to a particular candidate direction, the metrics may include a received signal strength (RSS), a signal-to-noise ratio (SNR), or other suitable metric measured at the receiving STA during the reception of that transmit training subfield 635. As another example, the metrics in that case may include a channel measurement such as a signal loss over the channel during transmission according to that particular candidate direction.

The transmitting STA (or the receiving STA) may determine an updated transmit antenna direction based on the performance metrics. In some embodiments, the updated transmit antenna direction may be selected as the candidate transmit antenna direction with the best performance metrics, for example the highest RSS and/or SNR. It should also be noted that determination of the updated transmit antenna direction at the transmitting STA may also include receiving notification from the receiving STA of which of the candidate antenna directions is to be used as the updated direction.

At operation 535 of the method 500, a second packet 600 may be transmitted to the receiving STA. Accordingly, at operation 540, the data portion 610 of the second packet 600 may be transmitted according to the updated transmit antenna direction. As such, a tracking of the transmit direction of the directional wireless link may be realized. The data portion 610 of the packet 600 previously described may be transmitted according to the current (before updating) transmit direction while the data portion 610 of the second packet 600 may be transmitted according to the updated transmit direction.

Figure 7:
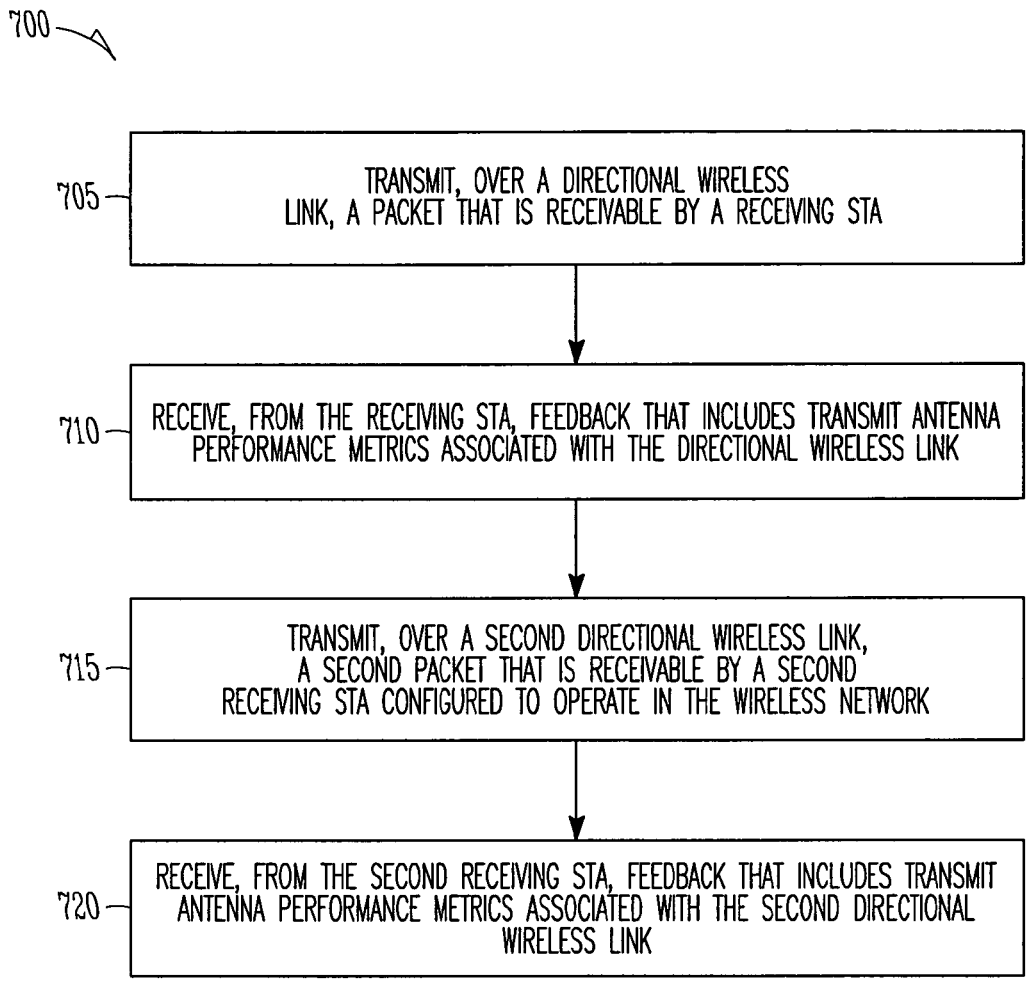
FIG. 7 illustrates another method of beam alignment of directional wireless links in accordance with some embodiments.

Referring to FIG. 7, another method 700 of beam-alignment of directional wireless links between a transmitting STA and multiple receiving STAs is shown. As with the method 500, embodiments of the method 700 may include additional or even fewer operations or processes in comparison to what is illustrated in FIG. 7 and are not necessarily limited to the chronological order that is shown in FIG. 7. In describing the method 700, reference may be made to FIGS. 1-6 and 8, although it is understood that the method 700 may be practiced with any other suitable systems, interfaces and components.

The method 700 may be practiced between a transmitting STA and two receiving STAs as shown in FIG. 7, but is not limited as such, and may also be practiced between the transmitting STA and any number of receiving STAs. In some embodiments, such as those that exclude operations 715 and 720, the method 700 may be practiced between a transmitting STA and a single receiving STA.

At operation 705, a packet that is receivable by a receiving STA may be transmitted over a directional wireless link from a transmitting STA to a receiving STA. Feedback may be received from the receiving STA at operation 710, and the feedback may include transmit antenna performance metrics associated with the directional wireless link. Previously described techniques related to similar or analogous operations in the method 500 may also be applied as part of the operations 705 and 710. For instance, the packet 600 may include a data portion 610, a receive training sequence 620, and a transmit training sequence 630 that occupy different portions of the packet 600. The receive training sequence 620 may include one or more receive training subfields 625, while the transmit training sequence 630 may include one or more transmit training subfields 635. The data portion 610 and receive training sequence 620 of the packet 600 may be transmitted according to a current transmit antenna direction associated with the link, while the transmit training sequence 630 of the packet 600 may be transmitted according to one or more candidate transmit antenna directions for the link. In addition, the receive training sequence 620 and transmit training sequence 630 may include subfields 625, 635 as described earlier regarding FIG. 6.

It should be noted that in some of the embodiments of the method 700 that include operations 705 and 710, but exclude operations 715 and 720, the receiving STA may be an AP or a base station while the transmitting STA may be a mobile device. In other embodiments that exclude operations 715 and 720, the transmitting STA may be an AP or a base station while the receiving STA may be a mobile device.

At operation 715, a packet that is receivable by a second receiving STA may be transmitted over a second directional wireless link from the transmitting STA, and feedback may be received from the second receiving STA at operation 720. The feedback may include transmit antenna performance metrics associated with the second directional wireless link, and previously described techniques related to similar or analogous operations in the method 500 and operations 705 and 710 may also be applied as part of the operations 715 and 720.

It should be noted that the operations 705-720 may be performed sequentially or simultaneously or a combination thereof. As an example, operations 705 and 715 may be performed simultaneously, while operations 710 and 720 may be performed simultaneously. In this example, the transmitting STA may be communicating simultaneously with multiple (in this case, two) receiving STAs over directional wireless links. In addition, the method 700 may be extended to include any number of receiving STAs beyond the two shown in FIG. 7.

Figure 8:
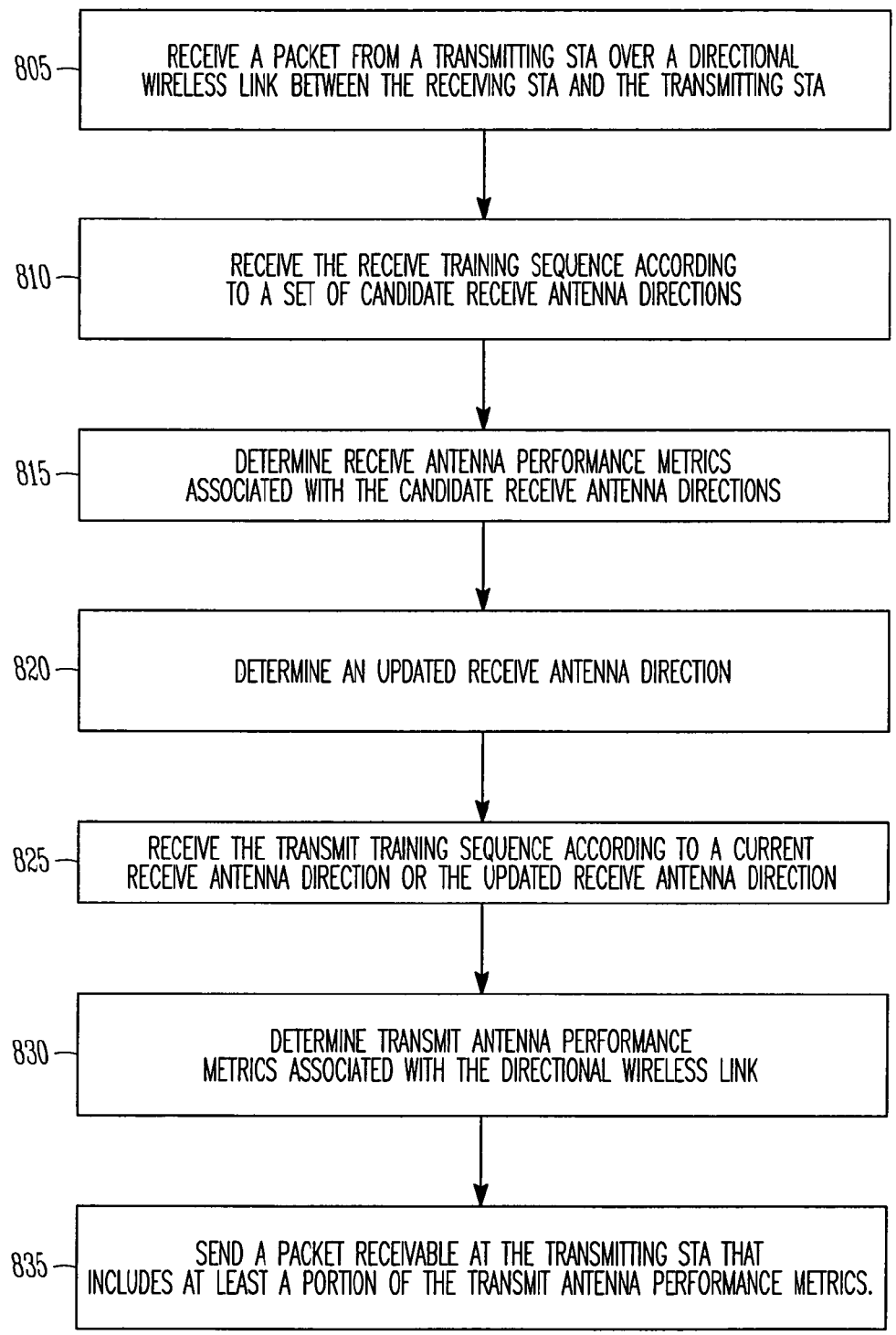
FIG. 8 illustrates another method of beam alignment of directional wireless links in accordance with some embodiments.

Referring to FIG. 8, another method 800 of beam-alignment of a directional wireless link at a receiving STA is shown. As with the methods 500 and 700, embodiments of the method 800 may include additional or even fewer operations or processes in comparison to what is illustrated in FIG. 8 and are not necessarily limited to the chronological order that is shown in FIG. 8. In describing the method 800, reference may be made to FIGS. 1-7, although it is understood that the method 800 may be practiced with any other suitable systems, interfaces and components. The method 800 may be practiced at a receiving STA that may be an access point or base station or a mobile device.

At operation 805, a packet may be received at a receiving STA from a transmitting STA over a directional wireless link between the receiving STA and the transmitting STA. Previously described techniques related to similar or analogous operations in the method 500 may also be applied as part of the operations in the method 800. For instance, the packet 600 may include a data portion 610, a receive training sequence 620, and a transmit training sequence 630 that occupy different portions of the packet 600. The receive training sequence 620 may include one or more receive training subfields 625, while the transmit training sequence 630 may include one or more transmit training subfields 635. The data portion 610 and receive training sequence 620 of the packet 600 may be transmitted according to a current transmit antenna direction associated with the link, while the transmit training sequence 630 of the packet 600 may be transmitted according to one or more candidate transmit antenna directions for the link. In addition, the receive training sequence 620 and transmit training sequence 630 may include subfields 625, 635 as described earlier regarding FIG. 6.

At operation 810, the receive training sequence 620 may be received at the receiving STA according to a set of candidate receive antenna directions. As an example, each of the receive training subfields 625 may be received according to a different candidate receive direction. As such, each of the candidate receive directions may be tested for reception quality. This example is not limiting, however, as other configurations may be used. For instance, each candidate receive direction may be used in the reception of multiple receive training subfields 625 in order to provide an even better measurement of the reception quality.

At operation 815, receive antenna performance metrics associated with the candidate receive antenna directions may be determined, and an updated receive antenna direction may be determined at operation 820. In some embodiments, the metrics may be related to the reception of the receive training subfields 625 at the receiving STA. For example, for a particular receive training subfield 625 received according to a particular candidate receive direction, the metrics may include a received signal strength (RSS), a signal-to-noise ratio (SNR), or other suitable metric measured at the receiving STA during the reception of that receive training subfield 625. As another example, the metrics in that case may include a channel measurement such as a signal loss over the channel during reception according to that particular candidate direction.

The receiving STA may determine an updated receive antenna direction based on the performance metrics. In some embodiments, the updated receive antenna direction may be selected as the candidate receive antenna direction with the best performance metrics, for example the highest RSS and/or SNR.

At operation 825, the transmit training sequence 630 of the packet may be received at the receiving STA. In some embodiments, the reception may be performed according to the current receive antenna direction used during the reception of the data portion 610 of the packet 600. In those embodiments, an updated receive antenna direction may be applied during reception of the next (or other subsequent) packets 600. In other embodiments, however, the reception of the transmit training sequence 630 may be performed according to the updated receive antenna direction determined as part of operation 820 or other appropriate operation. In those embodiments, the receive training sequence 620 may need to appear before the transmit training sequence 630 in the packet 600, and the processing associated with determining the updated receive antenna direction may need to be performed quickly enough such that the updated direction before the transmit training sequence 630 arrives at the receiving STA. Processing power or other factors may provide significant challenges for these embodiments.

In any case, transmit antenna performance metrics associated with the directional wireless link may be determined at operation 830. The metrics may be determined as part of the reception of the transmit training sequence 630 in operation 825. As in previously described techniques, the metrics may include a received signal strength (RSS), a signal-to-noise ratio (SNR), or other suitable metric measured at the receiving STA (or channel measurement) during the reception of the transmit training sequence 630 or transmit training subfields 635 of the sequence. As different transmit training subfields 635 may be transmitted according to different candidate transmit antenna directions, one or more of the metrics may be associated with each of the candidate directions.

At operation 835, a packet receivable at the transmitting STA that includes at least a portion of the transmit antenna performance metrics may be sent. The packet 600 may include the transmit antenna performance metrics as part of a payload portion, header or any suitable fields of the packet 600. Accordingly, the transmitting STA may be able to use the transmit antenna performance metrics to determine an updated (or improved) transmit direction for the directional wireless link as part of the beam alignment. In addition, in some embodiments, the receiving STA may determine or select a transmit direction based on the transmit antenna performance metrics, and may communicate the determination or selection back to the transmitting STA in addition to, or in place of, the transmit antenna performance metrics.

A transmitting station (STA) to support directional wireless links with multiple receiving STAs is disclosed herein. The transmitting STA may operate in a millimeter-wave (mmWave) wireless network. The transmitting STA may comprise hardware processing circuitry to, for each of the multiple receiving STAs, transmit a packet over a directional wireless link between the transmitting STA and the receiving STA and receive transmit antenna performance metrics from the receiving STA associated with the transmission of the packet over the directional wireless link between the transmitting STA and the receiving STA. The packet may include a data portion, a receive training sequence, and a transmit training sequence that occupy different portions of the packet. The transmission of the packet over the directional wireless link may include transmission of the data portion of the packet according to a current transmit antenna direction associated with the directional wireless link. The transmitting STA may further comprise one or more memories to configure the hardware processing circuitry. The transmitting STA may further comprise one or more antennas to transmit the packets over the directional wireless links.

The transmission of the packet over the directional wireless link may further include transmission of at least a portion of the transmit training sequence of the packet according to one or more candidate transmit antenna directions for the directional wireless link that are different from the current transmit antenna direction associated with the directional wireless link. The transmission of the packet over the directional wireless link may further include transmission of the receive training sequence of the packet according to the current transmit antenna direction associated with the directional wireless link. The transmit training sequence of the packet may include one or more transmit training subfields that occupy different portions of the transmit training sequence, and transmission of the packet over the directional wireless link may further include transmission of the transmit training subfields according to a set of candidate transmit antenna directions for the directional wireless link. At least one of the transmit training subfields may be transmitted according to each of the candidate transmit antenna directions, and at least one of the candidate transmit antenna directions may be different from the current transmit antenna direction associated with the directional wireless link.

The transmit antenna performance metrics may include performance metrics related to the reception of one or more of the transmit training subfields at the receiving STA. The performance metrics related to the reception of the transmit training subfields may include one or more of a received signal strength (RSS) at the receiving STA, a signal-to-noise ratio (SNR) at the receiving STA, or a channel measurement associated with the directional wireless link over which the packet is received at the receiving STA. The performance metrics related to the reception of the transmit training subfields may enable the transmitting STA to determine an updated transmit antenna direction for the directional wireless link between the transmitting STA and the receiving STA.

The hardware processing circuitry may be further to, for each of the multiple receiving STAs, determine an updated transmit antenna direction for the directional wireless link between the transmitting STA and the receiving STA based at least partly on the transmit antenna performance metrics received from the receiving STA. The hardware process circuitry may be further configured to, for each of the multiple receiving STAs, transmit to the receiving STA a second packet that includes a data portion, a receive training sequence, and a transmit training sequence, wherein the transmission of the second packet includes transmission of the data portion of the second packet according to the updated transmit antenna direction. The determination of the updated transmit antenna direction for the directional wireless link may include a selection of one of the candidate transmit antenna directions as the updated transmit antenna direction, and wherein the selection is based at least partly on the transmit antenna performance metrics. In some embodiments, the transmission of the second packet may occur within 500 milliseconds of the determination of the updated transmit antenna direction. In some embodiments, the receive training sequence of the packet may include one or more receive training subfields that occupy different portions of the receive training sequence. In some embodiments, transmission of the packet over the directional wireless link may further include transmission of the receive training sequence according to the current transmit antenna direction associated with the directional wireless link. In some embodiments, the hardware processing circuitry may be further to perform the transmission of the packet to each STA simultaneously.

A transmitting station (STA) to operate in a millimeter wave (mmWave) wireless network is also disclosed herein. The transmitting STA may be further to support directional wireless links with at least one receiving STA. The transmitting STA may comprise hardware processing circuitry to transmit, over a directional wireless link, a packet. In some embodiments, the packet may be receivable by a receiving STA that may operate in the wireless network. The hardware processing circuitry may be further to receive, from the receiving STA, feedback that includes transmit antenna performance metrics associated with the directional wireless link. The packet may include a data portion, a receive training sequence, and a transmit training sequence that occupy different portions of the packet. Transmitting the packet over the directional wireless link may include transmitting the data portion of the packet according to a current transmit antenna direction. Transmitting the packet over the directional wireless link may include transmitting the receive training sequence according to the current transmit antenna direction. Transmitting the packet over the directional wireless link may include transmitting the transmit training sequence according to a set of one or more candidate transmit antenna directions, such that at least a portion of the transmit training sequence is transmitted according to each candidate transmit antenna direction. The set of candidate transmit antenna directions may include at least one transmit antenna direction that is different from the current transmit antenna direction.

The transmit training sequence may include one or more transmit training subfields that occupy different portions of the transmit training sequence. At least one of the transmit training subfields may be transmitted according to a candidate transmit antenna direction that is different from the current transmit antenna direction. The transmit antenna performance metrics may include, for each transmit training subfield, performance metrics related to the reception of the transmit training subfield at the receiving STA. For each transmit training subfield, the performance metrics may include one or more of a received signal strength (RSS) at the receiving STA, a signal-to-noise ratio (SNR) at the receiving STA or a channel measurement.

The hardware processing circuitry may be further to transmit, over a second directional wireless link, a second packet. In some embodiments, the second packet may be receivable by a second receiving STA that may operate in the wireless network. The hardware processing circuitry may be further to receive, from the second receiving STA, feedback that includes transmit antenna performance metrics associated with the second directional wireless link. The second packet may include a receive training sequence and a transmit training sequence that occupy different portions of the second packet. Transmitting the second packet over the second directional wireless link may include transmitting at least a portion of the second packet according to a second current transmit antenna direction.

A non-transitory computer-readable storage medium that stores instructions for execution by one or more processors to perform operations for multi-user beam tracking is disclosed herein. The operations may configure the one or more processors to receive, at a receiving user station (STA), a packet from a transmitting STA over a directional wireless link between the receiving STA and the transmitting STA. In some embodiments, at least a portion of the packet may be transmitted according to a current transmit antenna direction. In some embodiments, at least a portion of the packet may be received according to a current receive antenna direction. The packet may include a receive training sequence and a transmit training sequence that occupy different portions of the packet. The operations may configure the one or more processors to determine, based at least partly on the reception of the receive training sequence, an updated receive antenna direction and to determine, based at least partly on the reception of the transmit training sequence, transmit antenna performance metrics associated with the directional wireless link and the transmitting STA.

The receive training sequence may be transmitted according to the current transmit antenna direction. The transmit training sequence may be transmitted according to a set of one or more candidate transmit antenna directions, such that at least a portion of the transmit training sequence is transmitted according to each candidate transmit antenna direction. The set of candidate transmit antenna directions may include at least one transmit antenna direction that is different from the current transmit antenna direction. The reception of the packet may include a reception of the receive training sequence according to a set of candidate receive antenna directions, wherein at least one of the candidate receive antenna directions is different from the current receive antenna direction. The reception of the receive training sequence may include, for each candidate receive antenna direction, a reception of at least a portion of the receive training sequence according to the candidate receive antenna direction and a determination of a receive antenna performance metric associated with the candidate receive antenna direction based on the reception according to the candidate receive antenna direction. The determination of the updated receive antenna direction may include a selection of one of the candidate receive antenna directions as the updated receive antenna direction, and wherein the selection is based at least partly on the receive antenna performance metrics. The transmit training sequence may include one or more transmit training subfields that occupy different portions of the transmit training sequence. At least one of the transmit training subfields may be transmitted according to a candidate transmit antenna direction that is different from the current transmit antenna direction. The determination of the transmit antenna performance metrics may include a determination, for each of the transmit training subfields, of one or more transmit antenna performance metrics based on the reception of the transmit training subfield at the receiving STA.

The operations may further configure the one or more processors to send, from the receiving STA, a packet that includes at least a portion of the transmit antenna performance metrics. The performance metrics for each transmit training subfield may include one or more of a received signal strength (RSS) related to the reception of the transmit training subfield, a signal-to-noise ratio (SNR) related to the reception of the transmit training subfield or a channel measurement. The receive training sequence may include one or more receive training subfields that occupy different portions of the receive training sequence and the transmit training sequence includes one or more transmit training subfields that occupy different portions of the transmit training sequence.

A beam refinement method at a receiving station (STA) to receive packets from a transmitting STA over a directional wireless link is disclosed herein. The STAs may operate in a wireless network. The method may comprise receiving, at the receiving STA, a packet from the transmitting STA over the directional wireless link. At least a portion of the packet may be transmitted according to a current transmit antenna direction and at least a portion of the packet may be received according to a current receive antenna direction. The packet may include a receive training sequence and a transmit training sequence that occupy different portions of the packet. The method may further comprise determining, based at least partly on the reception of the receive training sequence, an updated receive antenna direction. The method may further comprise determining, based at least partly on the reception of the transmit training sequence, transmit antenna performance metrics associated with the directional wireless link and the transmitting STA.

Receiving the packet may include receiving the transmit training sequence according to the current receive antenna direction. Receiving the packet may include receiving the transmit training sequence according to the updated receive antenna direction. The transmit training sequence may include one or more transmit training subfields that occupy different portions of the transmit training sequence. At least one of the transmit training subfields may be transmitted according to a candidate transmit antenna direction that is different from the current transmit antenna direction. The receive training sequence may include one or more receive training subfields that occupy different portions of the receive training sequence. Determining the transmit antenna performance metrics may include determining, for each of the transmit training subfields, one or more transmit antenna performance metrics based on the reception of the transmit training subfield at the receiving STA. The method may further comprise sending, from the receiving STA, a packet that includes at least a portion of the transmit antenna performance metrics.

A non-transitory computer-readable storage medium that stores instructions for execution by one or more processors to perform operations for beam tracking at a transmitting STA is disclosed herein. The operations may configure the one or more processors to transmit, over a directional wireless link, a packet. The operations may further configure the one or more processors to receive, from a receiving STA, feedback that includes transmit antenna performance metrics associated with the directional wireless link. In some embodiments, the packet may include a data portion, a receive training sequence, and a transmit training sequence that occupy different portions of the packet. In some embodiments, transmission of the packet over the directional wireless link may include transmission of the data portion of the packet according to a current transmit antenna direction.

In some embodiments, transmission of the packet over the directional wireless link may include transmission of the receive training sequence according to the current transmit antenna direction. In some embodiments, transmission of the packet over the directional wireless link may include transmission of the transmit training sequence according to a set of one or more candidate transmit antenna directions, such that at least a portion of the transmit training sequence is transmitted according to each candidate transmit antenna direction. In some embodiments, the set of candidate transmit antenna directions includes at least one transmit antenna direction that is different from the current transmit antenna direction.

A beam tracking method at a transmitting STA is disclosed herein. The method may include transmitting, over a directional wireless link, a packet. The method may further include receiving, from a receiving STA, feedback that includes transmit antenna performance metrics associated with the directional wireless link. In some embodiments, the packet may include a data portion, a receive training sequence, and a transmit training sequence that occupy different portions of the packet. In some embodiments, transmitting the packet over the directional wireless link may include transmitting the data portion of the packet according to a current transmit antenna direction.

In some embodiments, transmitting the packet over the directional wireless link may include transmitting the receive training sequence according to the current transmit antenna direction. In some embodiments, transmitting the packet over the directional wireless link may include transmitting the transmit training sequence according to a set of one or more candidate transmit antenna directions, such that at least a portion of the transmit training sequence is transmitted according to each candidate transmit antenna direction. In some embodiments, the set of candidate transmit antenna directions may include at least one transmit antenna direction that is different from the current transmit antenna direction.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The invention claimed is:

1. A transmitting station (STA) to support directional wireless links with multiple receiving STAs, the STAs to operate in a millimeter-wave (mmWave) wireless network, the transmitting STA comprising: hardware processing circuitry; and memory, to:
for each of the multiple receiving STAs:
configure transmitter circuitry to transmit a first packet over a directional wireless link between the transmitting STA and the receiving STA, the first packet including a data portion, a receive training sequence, and a transmit training sequence that occupy different portions of the first packet, the transmission of the first packet over the directional wireless link including transmission of the data portion of the first packet according to a current transmit antenna direction associated with the directional wireless link;
configure receiver circuitry to receive transmit antenna performance metrics from the receiving STA associated with the transmission of the first packet over the directional wireless link between the transmitting STA and the receiving STA;
determine an updated transmit antenna direction for the directional wireless link between the transmitting STA and the receiving STA based at least partly on the transmit antenna performance metrics received from the receiving STA; and
configure the transmitter circuitry to transmit to the receiving STA a second packet that includes a data portion, a receive training sequence, and a transmit training sequence that occupy different portions of the second packet, wherein the transmission of the second packet includes transmission of the data portion of the second packet according to the updated transmit antenna direction.

2. The transmitting STA according to claim 1, further comprising one or more antennas to transmit the first and second packets over the directional wireless links.

3. The transmitting STA according to claim 1, wherein the transmission of the first packet over the directional wireless link further includes transmission of at least a portion of the transmit training sequence of the first packet according to one or more candidate transmit antenna directions for the directional wireless link that are different from the current transmit antenna direction associated with the directional wireless link.

4. The transmitting STA according to claim 3, wherein the transmission of the first packet over the directional wireless link further includes transmission of the receive training sequence of the first packet according to the current transmit antenna direction associated with the directional wireless link.

5. The transmitting STA according to claim 1, wherein:
the transmit training sequence of the first packet includes one or more transmit training subfields that occupy different portions of the transmit training sequence; and
the transmission of the first packet over the directional wireless link further includes transmission of the transmit training subfields according to a set of candidate transmit antenna directions for the directional wireless link;
wherein at least one of the transmit training subfields is transmitted according to each of the candidate transmit antenna directions;
wherein at least one of the candidate transmit antenna directions is different from the current transmit antenna direction associated with the directional wireless link.

6. The transmitting STA according to claim 5, wherein the transmit antenna performance metrics include performance metrics related to the reception of one or more of the transmit training subfields at the receiving STA.

7. The transmitting STA according to claim 6, wherein the performance metrics related to the reception of the transmit training subfields:
include one or more of a received signal strength (RSS) at the receiving STA, a signal-to-noise ratio (SNR) at the receiving STA, or a channel measurement associated with the directional wireless link over which the first packet is received at the receiving STA; and
enable the transmitting STA to determine an updated transmit antenna direction for the directional wireless link between the transmitting STA and the receiving STA.

8. The transmitting STA according to claim 7, wherein the determination of the updated transmit antenna direction for the directional wireless link includes a selection of one of the candidate transmit antenna directions as the updated transmit antenna direction, and wherein the selection is based at least partly on the transmit antenna performance metrics.

9. The transmitting STA according to claim 7, wherein the transmission of the second packet occurs within 500 milliseconds of the determination of the updated transmit antenna direction.

10. The transmitting STA according to claim 5, wherein:
the receive training sequence of the first packet includes one or more receive training subfields that occupy different portions of the receive training sequence; and
the transmission of the first packet over the directional wireless link further includes transmission of the receive training sequence according to the current transmit antenna direction associated with the directional wireless link.

11. The transmitting STA according to claim 1, the hardware processing circuitry further to perform the transmission of the first packet to each STA simultaneously.

12. A non-transitory computer-readable storage medium that stores instructions for execution by one or more processors to perform operations for multi-user beam tracking; the operations to configure the one or more processors to:
receive, at a receiving user station (STA), a packet from a transmitting STA over a directional wireless link between the receiving STA and the transmitting STA, wherein at least a portion of the packet is received according to a current receive antenna direction, and wherein the packet includes a data portion, a receive training sequence, and a transmit training sequence that occupy different portions of the packet;
determine, based at least partly on the reception of the receive training sequence, an updated receive antenna direction; and
determine, based at least partly on the reception of the transmit training sequence, transmit antenna performance metrics associated with the directional wireless link and the transmitting STA.

13. The non-transitory computer-readable storage medium according to claim 12, wherein the reception of the packet includes a reception of the receive training sequence according to a set of candidate receive antenna directions, wherein at least one of the candidate receive antenna directions is different from the current receive antenna direction.

14. The non-transitory computer-readable storage medium according to claim 13, wherein the reception of the receive training sequence includes, for each candidate receive antenna direction:
a reception of at least a portion of the receive training sequence according to the candidate receive antenna direction; and
a determination of a receive antenna performance metric associated with the candidate receive antenna direction based on the reception according to the candidate receive antenna direction.

15. The non-transitory computer-readable storage medium according to claim 14, wherein the determination of the updated receive antenna direction includes a selection of one of the candidate receive antenna directions as the updated receive antenna direction, and wherein the selection is based at least partly on the receive antenna performance metrics.

16. The non-transitory computer-readable storage medium according to claim 13, wherein:
the transmit training sequence includes one or more transmit training subfields that occupy different portions of the transmit training sequence;
at least one of the transmit training subfields is transmitted according to a candidate transmit antenna direction that is different from the current transmit antenna direction; and
the determination of the transmit antenna performance metrics includes a determination, for each of the transmit training subfields, of one or more transmit antenna performance metrics based on the reception of the transmit training subfield at the receiving STA.

17. The non-transitory computer-readable storage medium according to claim 16, the operations to further configure the one or more processors to send, from the receiving STA, a packet that includes at least a portion of the transmit antenna performance metrics.

18. The non-transitory computer-readable storage medium according to claim 17, wherein the performance metrics for each transmit training subfield include one or more of a received signal strength (RSS) related to the reception of the transmit training subfield, a signal-to-noise ratio (SNR) related to the reception of the transmit training subfield or a channel measurement.

19. The non-transitory computer-readable storage medium according to claim 12, wherein the receive training sequence includes one or more receive training subfields that occupy different portions of the receive training sequence and the transmit training sequence includes one or more transmit training subfields that occupy different portions of the transmit training sequence.

20. A beam refinement method at a receiving station (STA) to receive packets from a transmitting STA over a directional wireless link, the STAs to operate in a wireless network, the method comprising:
receiving, at the receiving STA, a packet from the transmitting STA over the directional wireless link, wherein at least a portion of the packet is transmitted according to a current transmit antenna direction and at least a portion of the packet is received according to a current receive antenna direction, and wherein the packet includes a data portion, a receive training sequence, and a transmit training sequence that occupy different portions of the packet;
determining, based at least partly on the reception of the receive training sequence, an updated receive antenna direction; and
determining, based at least partly on the reception of the transmit training sequence, transmit antenna performance metrics associated with the directional wireless link and the transmitting STA.

21. The method according to claim 20, wherein receiving the packet includes receiving the transmit training sequence according to the current receive antenna direction.

22. The method according to claim 20, wherein receiving the packet includes receiving the transmit training sequence according to the updated receive antenna direction.

23. The method according to claim 20, wherein:
the transmit training sequence includes one or more transmit training subfields that occupy different portions of the transmit training sequence;
at least one of the transmit training subfields is transmitted according to a candidate transmit antenna direction that is different from the current transmit antenna direction;
the receive training sequence includes one or more receive training subfields that occupy different portions of the receive training sequence; and
determining the transmit antenna performance metrics includes determining, for each of the transmit training subfields, one or more transmit antenna performance metrics based on the reception of the transmit training subfield at the receiving STA.

24. The method according to claim 20, further comprising sending, from the receiving STA, a packet that includes at least a portion of the transmit antenna performance metrics.

25. A non-transitory computer-readable storage medium that stores instructions for execution by one or more processors to perform operations for beam tracking at a transmitting STA, the operations to configure the one or more processors to:
transmit, over a directional wireless link, a packet; and
receive, from a receiving STA, feedback that includes transmit antenna performance metrics associated with the directional wireless link;
wherein the packet includes a data portion, a receive training sequence, and a transmit training sequence that occupy different portions of the packet;
wherein transmission of the packet over the directional wireless link includes transmission of the data portion of the packet according to a current transmit antenna direction.

26. The non-transitory computer-readable storage medium according to claim 25, wherein:
transmission of the packet over the directional wireless link includes transmission of the receive training sequence according to the current transmit antenna direction;
transmission of the packet over the directional wireless link includes transmission of the transmit training sequence according to a set of one or more candidate transmit antenna directions, such that at least a portion of the transmit training sequence is transmitted according to each candidate transmit antenna direction; and
the set of candidate transmit antenna directions includes at least one transmit antenna direction that is different from the current transmit antenna direction.

27. A beam tracking method at a transmitting STA, comprising:
transmitting over a directional wireless link, a packet; and
receiving, from a receiving STA, feedback that includes transmit antenna performance metrics associated with the directional wireless link;
wherein the packet includes a data portion, a receive training sequence, and a transmit training sequence that occupy different portions of the packet;
wherein transmitting the packet over the directional wireless link includes transmitting the data portion of the packet according to a current transmit antenna direction.

28. The method according to claim 27, wherein:
transmitting the packet over the directional wireless link includes transmitting the receive training sequence according to the current transmit antenna direction;
transmitting the packet over the directional wireless link includes transmitting the transmit training sequence according to a set of one or more candidate transmit antenna directions, such that at least a portion of the transmit training sequence is transmitted according to each candidate transmit antenna direction; and
the set of candidate transmit antenna directions includes at least one transmit antenna direction that is different from the current transmit antenna direction.

* * * * *

UNITED STATES PATENT AND TRADEMARK OFFICE
CERTIFICATE OF CORRECTION

PATENT NO.       : 9,813,131 B2
APPLICATION NO.  : 15/128073
DATED            : November 7, 2017
INVENTOR(S)      : Maltsev et al.

Page 1 of 1

It is certified that error appears in the above-identified patent and that said Letters Patent is hereby corrected as shown below:

On the Title Page

In item (57), in "Abstract", in Column 2, Line 6, delete "(mm Wave)" and insert --(mmWave)-- therefor In the Claims In Column 17, Line 41, in Claim 12, delete "tracking;" and insert --tracking,-- therefor In Column 20, Line 14, in Claim 27, delete "Abeam" and insert --A beam-- therefor In Column 20, Line 16, in Claim 27, after "transmitting", insert --,--

Signed and Sealed this
Twenty-eighth Day of May, 2019

Andrei Iancu
*Director of the United States Patent and Trademark Office*